US00RE35136E

United States Patent [19]

Hasegawa et al.

[11] E Patent Number: Re. 35,136

[45] Reissued Date of Patent: Jan. 2, 1996

[54] ACTUATOR OF DIAPHRAGM TYPE

[75] Inventors: Jiro Hasegawa; Ikuo Nakamura; Tadashi Hishinuma, all of Yokohama, Japan

[73] Assignee: Jidosha Denki Kogyo Kabushiki Kaisha, Yokohama, Japan

[21] Appl. No.: 330,248

[22] Filed: Oct. 25, 1994

Related U.S. Patent Documents

Reissue of:

[64] Patent No.: 5,249,508
Issued: Oct. 5, 1993
Appl. No.: 841,330
Filed: Feb. 25, 1992

[30] Foreign Application Priority Data

Mar. 22, 1991 [JP] Japan ..... 3-017519
Mar. 22, 1991 [JP] Japan ..... 3-017527

[51] Int. Cl.[6] ..... F16J 3/02

[52] U.S. Cl. ..... 92/99; 92/104; 92/105

[58] Field of Search ..... 92/93, 99, 104, 92/105, 85 R

[56] References Cited

U.S. PATENT DOCUMENTS 4,559,864 12/1985 Sakakibara et al. ..... 91/459
4,586,427 5/1986 Thiel ..... 92/99
4,729,287 3/1988 Boehm et al. ..... 92/99

FOREIGN PATENT DOCUMENTS 2546480 5/1976 Germany ..... 92/99

*Primary Examiner*—F. Daniel Lopez
*Attorney, Agent, or Firm*—Sughrue, Mion, Zinn, Macpeak & Seas

[57] ABSTRACT

An actuator (1) of a diaphragm type which comprises an actuator case (2,3), a diaphragm (5) housed in the actuator case, a diaphragm plate (4) attached to the diaphragm for moving together with the diaphragm according to introduction of negative or atmospheric pressure into a negative pressure chamber (7) formed between the diaphragm and the actuator case (2) so as to actuate a device connected to the diaphragm plate. The diaphragm is formed with one or both of an annular rib (5e) having a thick-walled section and an annular expansive portion (5d) having a curved section. Therefore, the diaphragm is hard to be disengaged from the diaphragm plate even if an immoderate force is applied on the diaphragm.

2 Claims, 4 Drawing Sheets

ACTUATOR OF DIAPHRAGM TYPE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an actuator of a diaphragm type used for actuating, for example, a throttle value in an automatic cruising control system which controls automatically a speed of an automotive vehicle at a set cruising speed.

2. Description of the Prior Art

Heretofore there has been used an actuator of a diaphragm type shown in FIGS. 3 and 4 for actuating the throttle valve in the automatic cruising control.

In an actuator 50 shown in FIG. 3, a first casing forming one side of an actuator case is formed with a flange 51a on the outer periphery thereof, and provided with an introduction pipe 5b at the center part thereof. The first casing 51 is provided with a spring fitting part 51c formed in a concave shape surrounding the introduction pipe 51b on the inner side thereof.

A second casing 52 forming another side of the actuator case is provided with a flange engaging part 52a to be engaged with the flange 51a of the first casing 51 on the outer periphery thereof so as to form the actuator case by coupling the first and the second casings 51 and 52 with each other in one body, and formed with a through hole 52b for passing through a diaphragm plate 54 at the center part thereof, which will be described later.

A diaphragm 53, which is made of rubber, is formed with a rim 53b on the outer periphery thereof, and provided with a plate fitting part 53c formed in annular shape in the center part thereof, as shown also in FIG. 4.

The diaphragm 53 is fixed in the actuator case by holding the rim 53b between the flange 51a of the first casing 51 and the flange engaging part 52a of the second casing 52, and attached with the diaphragm plate 54 in the plate fitting part 53c thereof.

The diaphragm plate 54 is formed with a cable connector 54a engaged with a throttle cable 60 connected to a throttle valve (not shown) of the vehicular engine, a recess 54b for engaging with the plate fitting part 53c of the diaphragm 53 and the projection 54c for fitting a conical spring 55. The diaphragm plate 54 is attached to the diaphragm 53 by fitting the plate fitting part 53c of the diaphragm 53 into the recess 54b of the diaphragm plate 54 according to the function of the elasticity of the diaphragm 53.

The conical spring 55 is disposed between the diaphragm plate 54 and the first casing 51 of the actuator case by engaging its both ends to the projection 54c of the diaphragm plate 54 and the spring fitting part 51c of the first casing 51. Thus, a negative pressure chamber 56 is formed between the first casing 51 and the diaphragm 53 attached with the diaphragm plate 54 enerigized by the conical spring 55 in the leftward direction in FIG. 3.

In the actuator 50 having the aforementioned structure, when negative pressure is introduced into the negative pressure chamber 56 through the introduction pipe 51b according to a command output from a controller of the automatic cruising control system (not shown), the pressure in the negative pressure chamber 56 is reduced and the diaphragm plate 54 moves together with the diaphragm 53 against the elastic force of the conical spring 55 in the rightward direction in FIG. 3.

According to the rightward movement of the diaphragm plate 54, the throttle valve of the vehicular engine is actuated in the opening direction through the throttle cable 60, thereby accelerating the vehicle so as to maintain the vehicle speed constantly at the set cruising speed.

Then, when atmospheric pressure is introduced into the negative pressure chamber 56 through the introduction pipe 51b by operating valves (not shown) according to a command output from the controller, the diaphragm plate 54 moves together with the diaphragm 53 by the elastic force of the conical spring 55 in the leftward direction in FIG. 3, and the throttle valve is returned in the closing direction through the throttle cable 60.

In this time, the plate fitting part 53c of the diaphragm 53 is fitted in the recess 54b of the diaphragm plate 54 so as not to leak the pressure in the negative pressure chamber 56.

However, the aforementioned conventional actuator 50 is so constructed that the diaphragm plate 54 is attached to the diaphragm 53 by fitting the plate fitting part 53c of the diaphragm 53 into the recess 54b of the diaphragm plate 54, that is merely by the function of the elastic force of the diaphragm 53, consequently, there is the possibility that the plate fitting part 53c of the diaphragm 53 is pulled outwardly and the plate fitting part 53c is disengaged from the recess 54b of the diaphragm plate 54 if the pressure in the negative pressure chamber 56 is reduced excessively. Accordingly, there is a problem in that it becomes impossible to actuate the throttle valve of the vehicular engine and control the vehicle speed constantly at the set cruising speed since the air flows into the negative pressure chamber 56 in the case where the plate fitting part 53c of the diaphragm 53 is disengaged from the recess 54b of the diaphragm plate 54.

SUMMARY OF THE INVENTION

This invention, therefore, is made to solve the aforementioned problem of the prior art. It is an object to provide an actuator of a diaphragm type which is possible to prevent the disengagement of the diaphragm plate from the diaphragm.

The construction of the actuator of the diaphragm type for controlling a device mounted on an automatic vehicle according to this invention in order to accomplish the above-mentioned object is characterized in that it comprises an actuator case, a diaphragm housed in the actuator case, formed with a plate fitting part in the center part thereof and forming a negative pressure chamber together with the actuator case, and a diaphragm plate connected to the device and attached to the plate fitting part of the diaphragm for moving in companmy with the diaphragm according to introduction of negative pressure or atmospheric pressure into the negative pressure chamber so as to actuate the device, and the diaphragm is formed with one or both of an annular rib having a thick-walled section and an annular expansive portion having a semicircularly curved section surrounding the plate fitting part attached thereto.

In the actuator of the diaphragm type according to this invention, the diaphragm is formed with one or both of the annular rib having a thick-walled section and the annular expansive portion having a semicircularly curved section surrounding the plate fitting part.

The annular and thick-walled rib provided on the diaphragm is given good rigidity as compared with the other parts of the diaphragm, therefore, the diaphragm is so structured that the rib may prevent the center part of the diaphragm from being pulled outwardly even if the pressure in the negative pressure chamber is reduced excessively and the other parts of the diaphragm is deformed by the excessive force.

Additionally, the annular expansive portion having a semicircularly curved section is structured so as to be deformed very easily, therefore, the annular expansive portion is so designed as to isolate the center part of the diaphragm from the tensile force applied on the diaphragm by its own deformation even if the pressure in the negative pressure chamber is reduced extraordinarily.

Accordingly, it is hard to disengage the diaphragm formed with one or both of the annular rib and the annular expansive portion from the diaphragm plate.

DESCRIPTION OF THE PREFERRED EMBODIMENT

An embodiment of the actuator of the diaphragm type according to this invention will be described below by exemplifying a case of applying the actuator to an automatic cruising control system on basis of FIG. 1 and FIG. 2.

Figure 1:
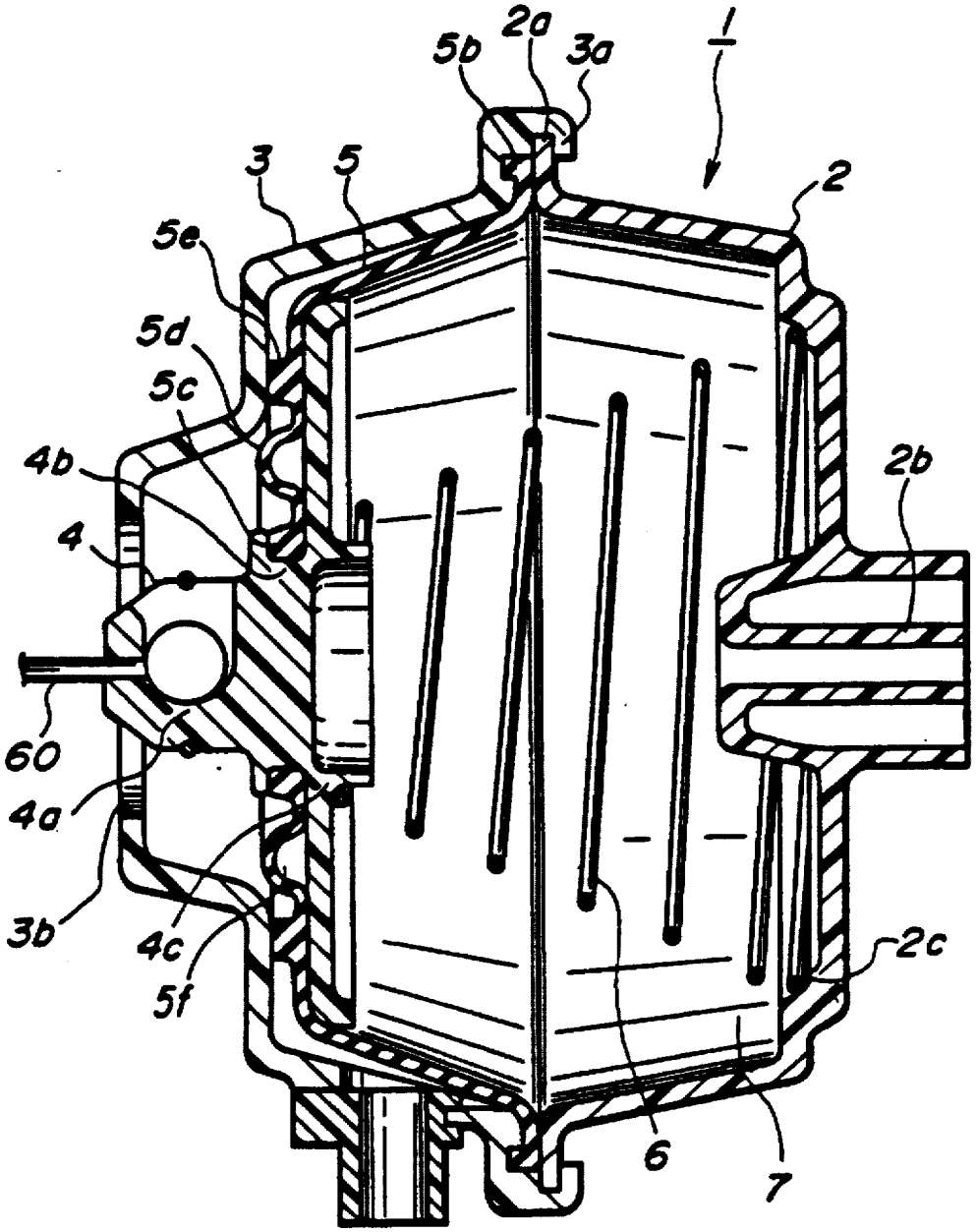
FIG. 1 is a vertical sectional view illustrating an embodiment of an actuator of a diaphragm type according to this invention.

An actuator 1 shown in FIG. 1 is provided with a flange 2a on the outer periphery of a first casing 1 forming one side of an actuator case, and provided with an introduction pipe 2b for introducing negative pressure or atmospheric pressure at the center part of the first casing 1. The first casing 1 is provided with a spring fitting part 2c surrounding the introduction pipe 2b and formed in a concave shape on the inner side thereof, and the introduction pipe 2b is communicated with a vacuum source such as an intake manifold of the vehicular engine and the atmosphere through respective valves (not shown).

A second casing 3 forming another side of the actuator case is provided with a flange engaging part 3a to be engaged with the flange 2a on the outer periphery thereof to form the actuator case by coupling the first and the second casings 2 and 3 with each other in one body, and formed with a through hole 3b at the center part thereof for passing through a diaphragm plate 4, which will be described later.

Figure 2:
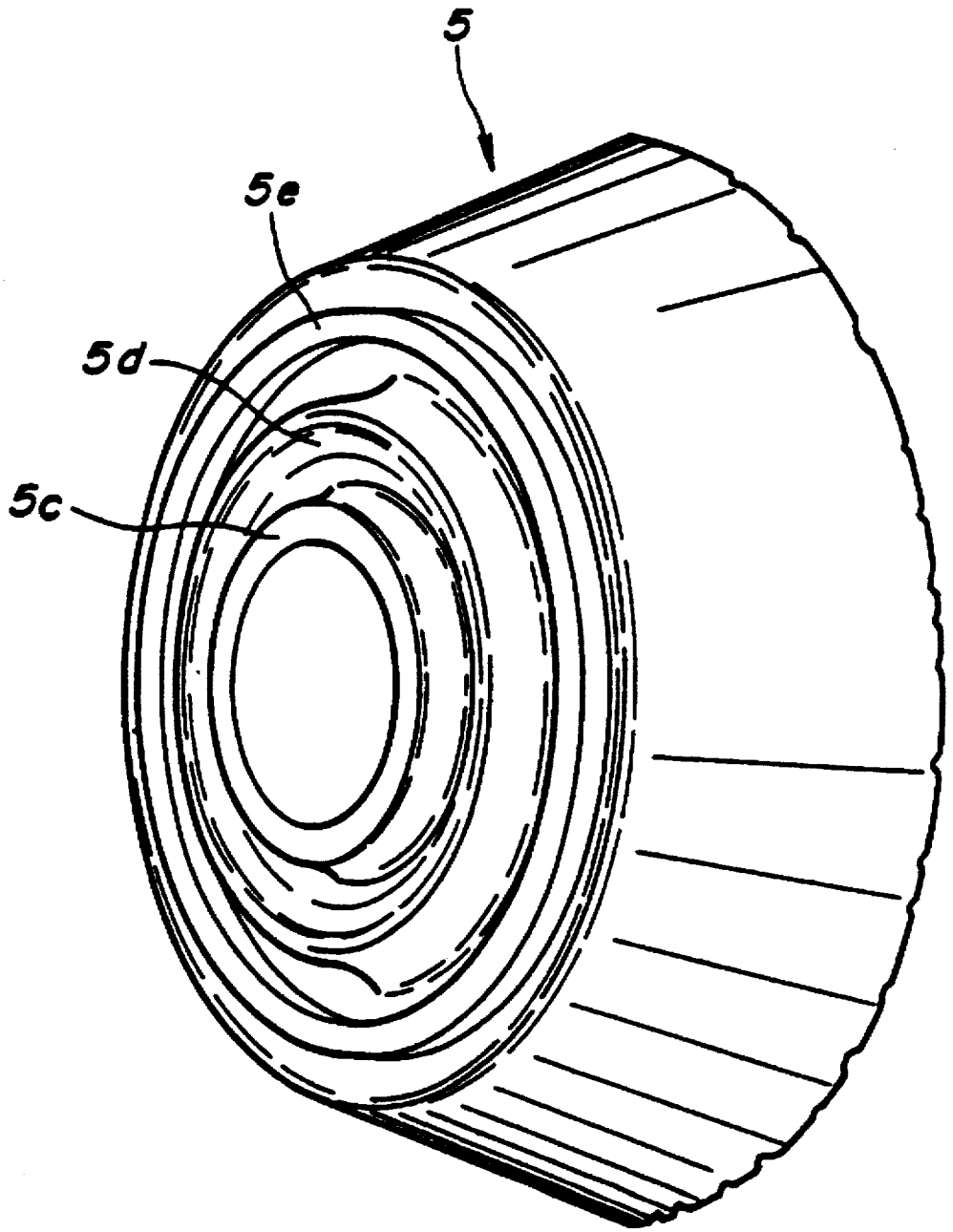
FIG. 2 is a perspective view illustrating a diaphragm of the actuator shown in FIG. 1.
Figure 3:
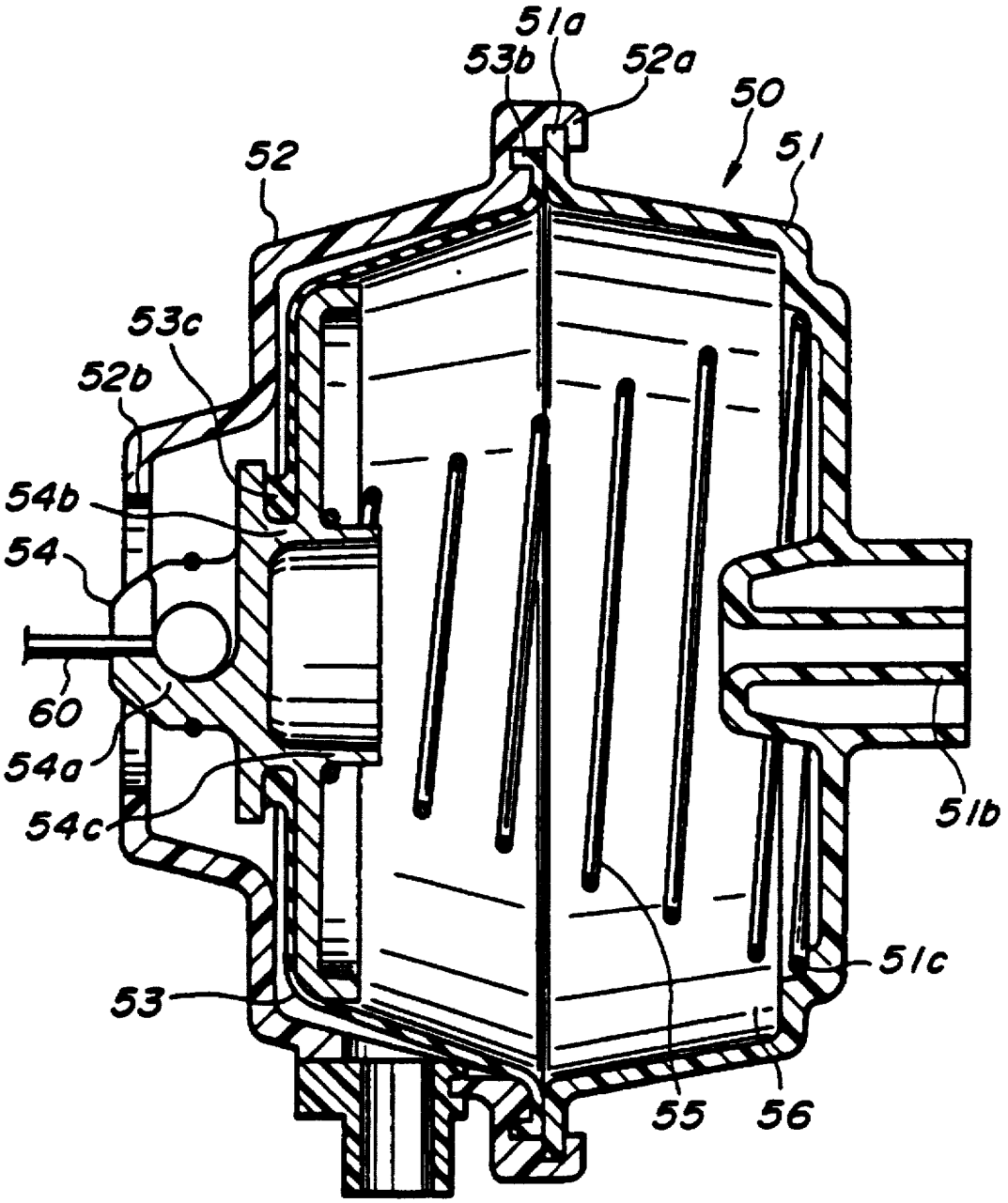
FIG. 3 (PRIOR ART)
FIG. 3 is a vertical sectional view of a conventional actuator of a diaphragm type.
Figure 4:
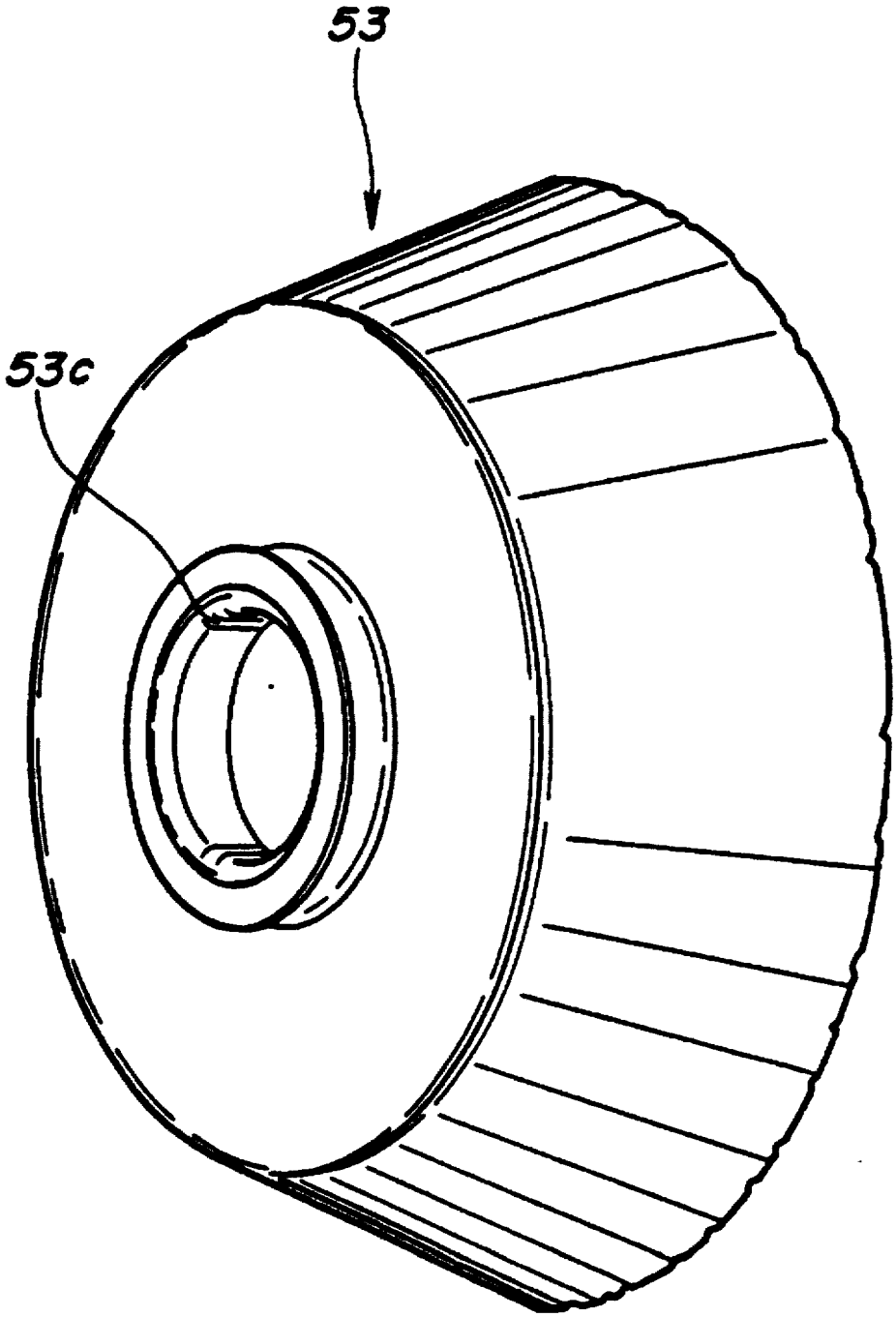
FIG. 4 (PRIOR ART)
FIG. 4 is a perspective view of a diaphragm of the conventional actuator shown in FIG. 3.

A diaphragm 5, which is made of rubber in a cup-like shape, is formed with a rim 5b on the outer periphery thereof, and provided with a plate fitting part 5c formed in annular shape in the center part thereof as shown also in FIG. 2.

The diaphragm 5 is further formed with an annular expansive portion 5d having a thickness similar to that of another part of the diaphragm body and a semicircularly curved section adjacent to and surrounding the plate fitting part 5c with the semicircularly curved section being spaced from the diaphragm plate plate 4 to form an air space 5f therebetween. Additionally, the diaphragm 5 is also formed with an annular rib 5c having a thick-walled section and good rigidity as compared with another part of the diaphragm body, and projecting on the side of the second casing 3 in the vicinity of the outer periphery of the annular expansive portion 5d in this embodiment.

The diaphragm 5 is fixed on the inside of the actuator case by holding the rim 5b between the flange 2a of the first casing 2 and the flange engaging part 3a of the second casing 3 and attached to the diaphragm plate 4 by the plate fitting part 5c.

The diaphragm plate 4 is provided with a cable connector 4a engaged with a throttle cable 60 connected to a throttle valve (not shown) of the vehicular engine, a recess 4b to be engaged to the plate fitting part 5c of the diaphragm 5 and a projection 4c to be fitted with an end of a conical spring 6. The diaphragm plate 4 is attached to the center part of the diaphragm 5 by fitting the plate fitting part 5c of the diaphragm 5 into the recess 4b of the diaphragm plate 4 according to the function of the elastic force of the diaphragm 5.

The conical spring 6 is disposed between the diaphragm plate 4 and the first casing 2 of the actuator case by engaging its both ends to the projection 4c of the diaphragm plate 4 and the spring fitting part 2c of the first casing 2, respectively. Thus a negative pressure chamber 7 is formed between the first casing 23 and the diaphragm 5 attached to the diaphragm plate 4 and enerigized by the conical spring 6 in the leftward direction in FIG. 1.

In the actuator 1 having the aforementioned structure, when the negative pressure is introduced into the negative pressure chamber 7 through the introduction pipe 2b and the valve (not shown) according to an acceleration command output from a controller of the automatic cruising control system, the pressure in the negative pressure chamber 7 is reduced and the diaphragm plate 4 moves together with the diaphragm 5 against the elastic force of the conical spring 6 in the rightward direction in FIG. 1. According to the rightward movement of the diaphragm plate 4, the throttle cable 60 is pulled and the throttle valve of the vehicular engine is actuated in the opening direction through the throttle cable 60, thereby accelerating the vehicle so as to maintain the vehicle speed constantly at the setting cruising speed.

When the atmospheric pressure is introduced into the negative pressure chamber 7 through the introduction pipe 2b by operating the valves (not shown) according to a deceleration command output from the controller, the pressure in the negative pressure chamber 7 is increased and the diaphragm plate 4 moves together with the diaphragm 5 by the elastic force of the conical spring 6 in the leftward direction in FIG. 1. According to the leftward movement of the diaphragm plate 4, the throttle valve is returned in the closing direction through the throttle cable 60, thereby decelerating the vehicle so as to maintain the vehicle speed constantly at the setting cruising speed.

In this time, the annular rib 5e formed in the thick-walled shape on the diapahragm 5 prevents the plate fitting part 5c from being pulled outwardly even if the pressure in the negative pressure chamber 7 is reduced excessively by some cause, and the other parts of the diaphragm 5 are deformed. In addition to above, the annular expansive portion 5d disposed between the annular rib 5e and the plate fitting part 5c on the diaphragm 5 absorbs tensile force to be applied on the plate fitting part 5c by deformation of portion 5d even if the annular rib 5e cannot prevent the tensile force from being applied on the plate fitting part 5c sufficiently.

Accordingly, the plate fitting part 5c is never deformed and the diaphragm plate 4 is never disengaged from the plate fitting part 5c of the diaphragm 5 even if the excessive force is applied on the diaphragm 5. And it is possible to control the throttle valve of the vehicular engine with high accuracy according to the command from the controller of the automatic cruising control system since the air is prevented from flowing into the negative pressure chamber 7.

As described above, in the actuator of the diaphragm type according to this invention having the aforementioned construction, the annular rib formed on the diaphragm prevents the center part of the diaphragm from being pulled outwardly even if the pressure in the negative pressure chamber is reduced excessively and the other parts of the diaphragm are deformed by the excessive force. The annular expansive portion 5d formed on the diaphragm isolates the center part of the diaphragm from the tensile force applied on the diaphragm by its own deformation even if the pressure in the neagative pressure chamber is reduced excessively. Therefore, the center part of the diaphragm is hard to be deformed and the diaphragm is never disengaged from the diaphragm plate even if the excessive force is applied on the diaphragm from one cause or another. An excellent effect can be obtained since the air is prevented from flowing into the negative pressure chamber and it is possible to actuate the device mounted on the automotive vehicle with high accuracy, such as the throttle valve of the vehicular engine, for example.

What is claimed is:

1. An actuator of a diaphragm type for controlling a device mounted on an automotive vehicle, comprising:

an actuator casing having first and second cup-shaped casing halves engaged with each other, the second casing half having an opening through a center part thereof;

a diaphragm disposed between said first and second casing halves of said actuator casing and forming a negative pressure chamber together with said first casing half of said actuator casing, said diaphragm having a plate fitting portion in a center part thereof, said plate fitting portion having a center aperture therethrough [and a annular rib surrounding the center aperture];

a diaphragm plate disposed in the actuator casing and secured to said plate fitting portion of said diaphragm, said diaphragm plate having a projecting portion with a cable connecting member projecting through the opening in said second casing half of said actuator casing;

a conical spring disposed between said diaphragm plate and said first casing half of said actuator casing, said conical spring urging said diaphragm plate and said plate fitting portion toward said second casing half of said actuator casing; and said diaphragm further having an annular expansive portion having a semicircularly curved section extending toward said second casing half and located adjacent to the plate fitting portion and spaced from said diaphragm plate to form an air space with said diaphragm plate.

*2. An actuator of a diaphragm type as set forth in claim 1, wherein said diaphragm further includes an annular rib surrounding the annular expansive portion.*

* * * * *